United States Patent [19]
Ho

[11] Patent Number: 5,117,378
[45] Date of Patent: May 26, 1992

[54] LAPTOP COMPUTER WITH DETACHABLE INTERFACE CARD

[76] Inventor: Hertz Ho, Fl. 3, No. 148, Sec. 4, Chung-Ching N. Rd., Taipei City, Taiwan

[21] Appl. No.: 551,143

[22] Filed: Jul. 11, 1990

[30] Foreign Application Priority Data

Apr. 6, 1990 [CA] Canada .................. 2014122

[51] Int. Cl.⁵ .............. G06F 1/00; H05K 5/00; H05K 7/16
[52] U.S. Cl. .................... 364/708; 361/391
[58] Field of Search .......... 364/708; 361/391

[56] References Cited

U.S. PATENT DOCUMENTS

| | | | |
|---|---|---|---|
| 4,530,066 | 7/1985 | Ohwaki et al. | 364/708 |
| 4,858,162 | 8/1989 | Kieffer et al. | 364/708 |
| 4,893,263 | 1/1991 | Myers | 364/708 |
| 4,991,058 | 2/1991 | Watkins et al. | 361/391 |

Primary Examiner—David H. Malzahn
Attorney, Agent, or Firm—Morgan & Finnegan

[57] ABSTRACT

The laptop computer includes a main computer body having a rear exposed portion, and a first and a second rear cover for the rear exposed portion. The first and second rear covers are detachable and can be interchangeably connected to the rear exposed portion. The first rear cover confines an extension space adjacent to the rear exposed portion when it is attached. The second rear cover has a size smaller than the first rear cover and simply covers the rear exposed portion. The laptop computer further includes an interface card detachably and optionally attached to the rear exposed portion and received by the extension space of the first rear cover.

3 Claims, 3 Drawing Sheets

LAPTOP COMPUTER WITH DETACHABLE INTERFACE CARD

BACKGROUND OF THE INVENTION

The invention relates to a laptop computer, more particularly to a laptop computer having a detachable interface card.

The Input/Output (I/O) port is a main feature of any computer, including the laptop computer. However, for most users who do not use the I/O port regularly, the interface card associated with the I/O port is unnecessary and thus adds bulk to the laptop computer.

SUMMARY OF THE INVENTION

Therefore, the object of this invention is to provide a laptop computer with a detachable interface card in order to reduce the size of the same when the Input/Output port is not in use.

Accordingly, a laptop computer of this invention comprises a main computer body having a rear exposed portion, and a first rear cover and a second rear cover for the rear exposed portion. The first and second rear covers are detachably and interchangeably connected to the rear exposed portion. The first rear cover confines an extension space adjacent to the rear exposed portion when the first rear cover is attached. The second rear cover has a size smaller than the first rear cover and simply covers the rear exposed portion. The laptop computer further comprises an interface card detachably and optionally attached to the rear exposed portion and received by the extension space of the first rear cover.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 1:
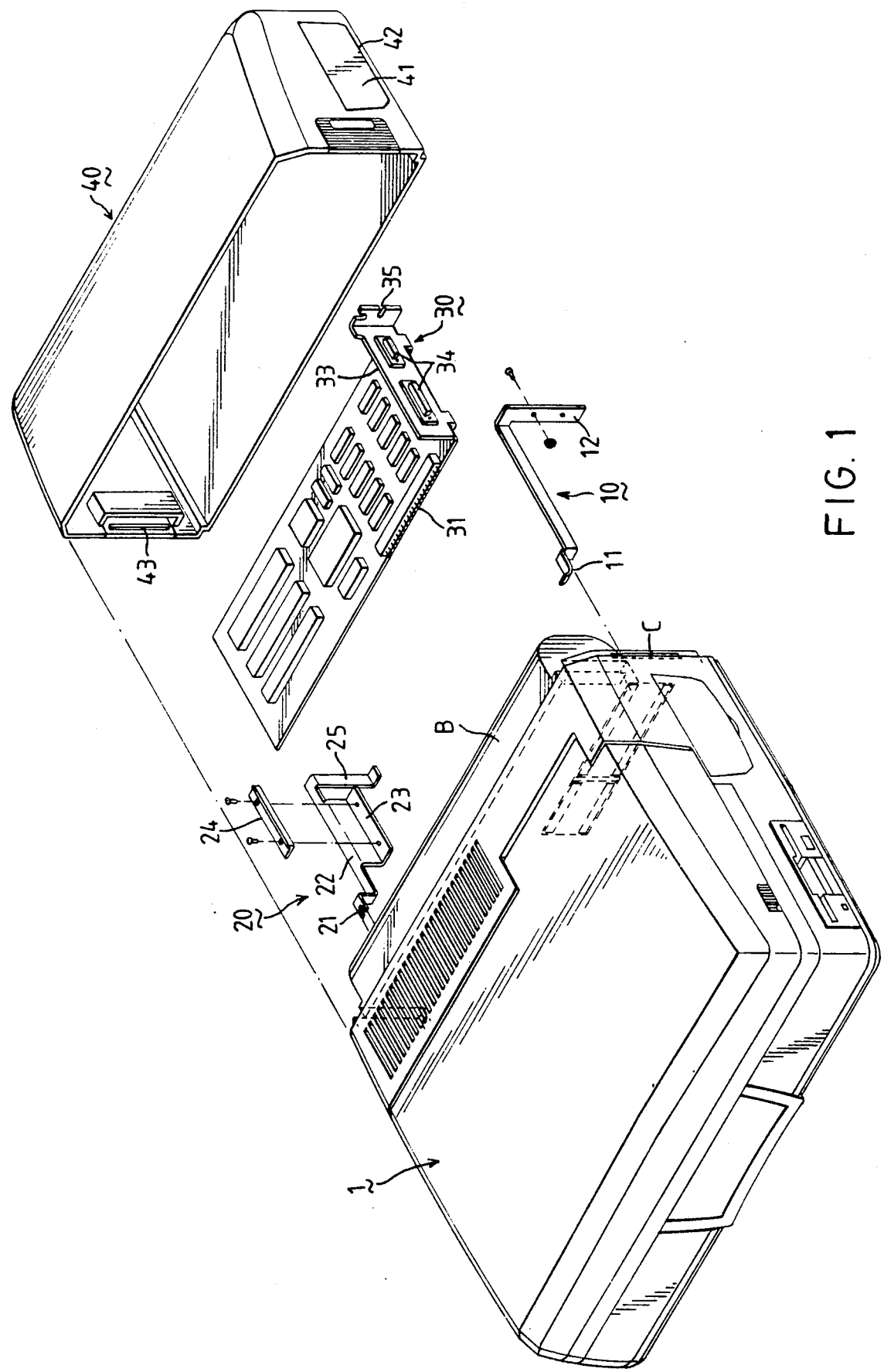
FIG. 1 is an exploded view of the preferred embodiment according to this invention.

Referring to FIG. 1, a laptop computer according to this invention comprises a main computer body 1, a first support arm 10, a second support arm 20, an interface card 30, and a first rear cover 40.

Figure 2:
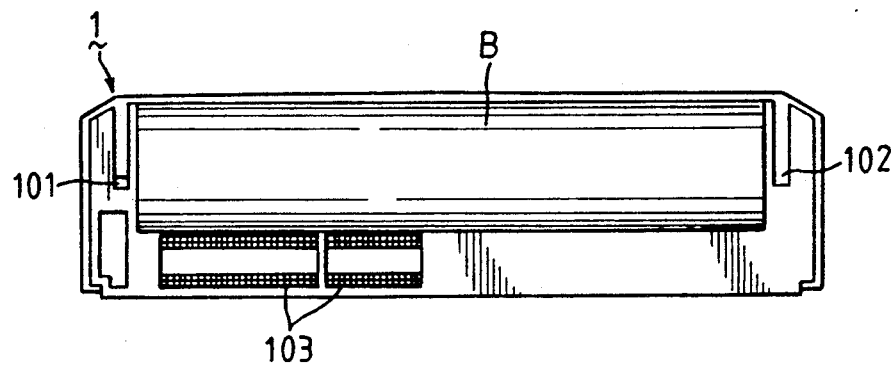
FIG. 2 is a rear view of a main computer body according to this invention.

FIG. 2 is a rear view of the main computer body 1 according to this invention. The rear exposed portion of the main computer body 1 has a first and a second engaging groove 101, 102 oppositely disposed along the width of the main computer body 1, and a female electrical connector 103 near a base end of the same. A storage battery B disposed at the rear exposed portion of the main computer body 1 supplies the necessary power to the laptop computer.

Figure 3:
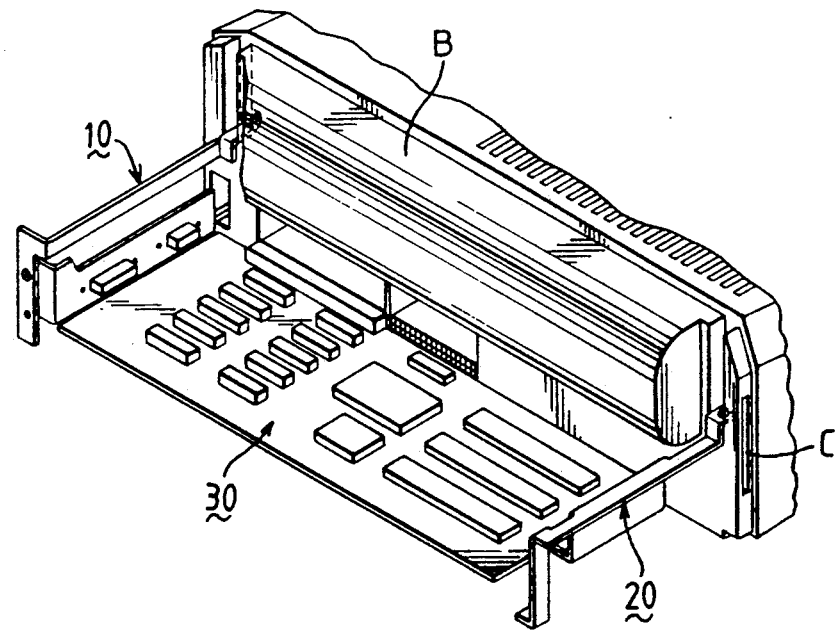
FIG. 3 is a perspective view of the preferred embodiment showing assembly.

Referring again to FIG. 1, the first support arm 10 has a first end 11 removably attached to the first engaging groove 101. A second end 12 of the same extends rearward and then downward from the first engaging groove 101. The second support arm 20 has a first end 21 received by the second engaging groove 102 and an angled seat flange 23 formed on a middle section 22. A second end 25 of the second support arm 20 extends rearward and then downward from the second engaging groove 102. The interface card 30 has a male electrical connector 31 for electrically communicating with the female electrical connector 103 of the main computer body 1. A vertical wall 33, which projects from a first side of the interface card 30, has female electrical connectors 34 mounted therein. The vertical wall 33 further includes a transverse end projection 35 screwed to the second end 12 of the first support arm 10. A second side of the interface card 30, opposite the first side, rests on the seat flange 23 of the second support arm 20 and is clamped thereat by a clamping member 24 screwed to the seat flange 23. FIG. 3 shows the interface card 30 attached to the main computer body 1 and held firmly in place by the first and second support arms 10, 20.

Referring once more to FIG. 1, the first rear cover 40 is detachably attached to the rear exposed portion of the main computer body 1. The first rear cover 40 has a pair of oppositely disposed vertical projections 43, which are received by elongated vertical slots C formed on the periphery of the main computer body 1. The first rear cover 40 confines an extension space adjacent to the rear exposed portion. The interface card 30 is received in the extension space when the first rear cover 40 is attached to the rear exposed portion. An access opening 41 is formed on a side wall of the first rear cover 40 and is adjacent to the vertical wall 33 of the interface card 30. The access opening 41 permits the electrical connection of external cables with the female electrical connectors 34 of the interface card 30. A plate cover 42 covers the access opening 41 when the interface card 30 is not in use.

Figure 4:
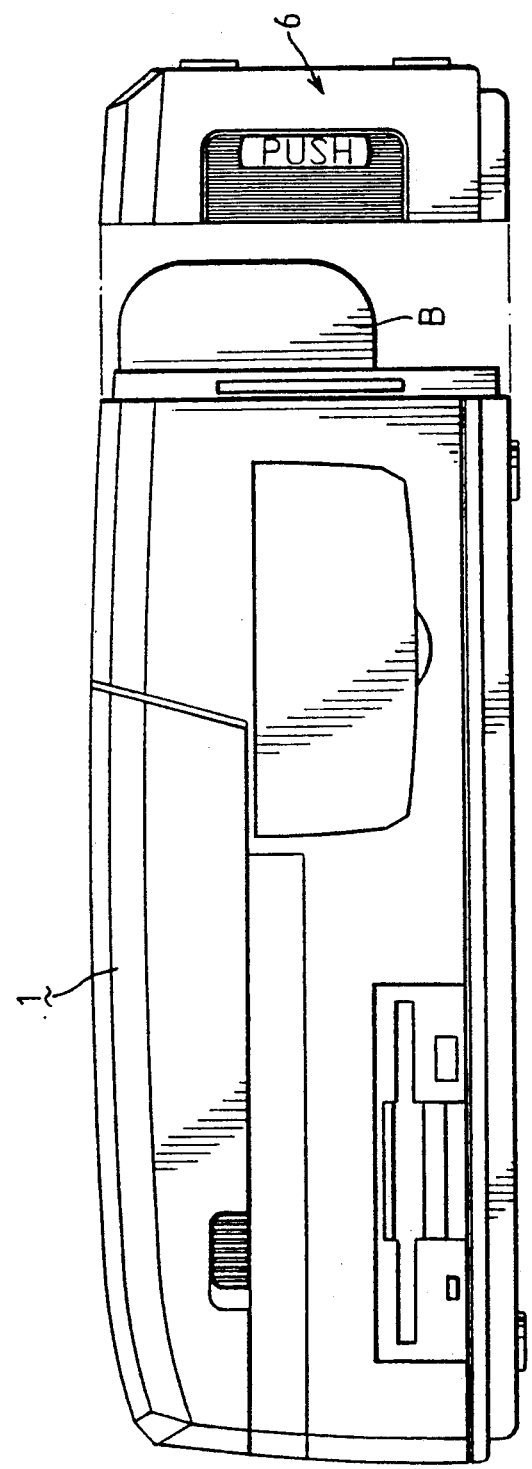
FIG. 4 is a side view illustrating the assembly of a second rear cover of this invention to the main computer body of FIG. 2.

If it is desired that the interface card 30 be detached from the main computer body 1, a second rear cover 6, as shown in FIG. 4, can be used to protect the rear exposed portion of the main computer body 1. The second rear cover 6 is similarly detachable from the main computer body 1, has a size smaller than the first rear cover 40, and simply covers the rear exposed portion. The size of the laptop computer of this invention when the interface card 30 is not attached is therefore smaller and more compact.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A laptop computer comprising a main computer body having a rear exposed portion, and a first rear cover and a second rear cover for said rear exposed portion, said first and said second rear covers being detachably and interchangeably connected to said rear exposed portion, said first rear cover confining an extension space adjacent to said rear exposed portion when said first rear cover is attached to said rear exposed portion, said second rear cover having a size smaller than said first rear cover and simply covering said rear exposed portion when said second rear cover is attached, said laptop computer further having an interface card detachably and optionally attached to said rear exposed portion, said extension space of said first rear cover receiving said interface card when said interface card is attached, wherein said interface card has a first side with a vertical wall projecting therefrom, said vertical wall having electrical connectors mounted thereon, and wherein said first rear cover includes an access opening adjacent to said vertical well when said first rear cover is attached to said rear exposed portion, said access opening permitting electrical connection of said interface card with external cables.

2. A laptop computer as claimed in claim 1, wherein said first rear cover further comprises a plate cover for said access opening.

3. A laptop computer comprising a main computer body having a rear exposed portion, and a first rear cover and a second rear cover for said rear exposed portion, said first and said second rear covers being detachably and interchangeably connected to said rear exposed portion, said first rear cover confining an extension space adjacent to said rear exposed portion when said first rear cover is attached to said rear exposed portion, said second rear cover having a size smaller than said first rear cover and simply covering said rear exposed portion when said second rear cover is attached, said laptop computer further having an interface card detachably and optionally attached to said rear exposed portion, said extension space of said first rear cover receiving said interface card when said interface card is attached, said laptop computer further comprising a first support arm extending rearward and then downward from said rear exposed portion and having a first end removably attached to said rear exposed portion; a second support arm spaced from said first support arm and extending rearward and then downward from said rear exposed portion, said second support arm having a first end removably attached to said rear exposed portion and a middle section with an angled seat flange, said interface card placed between and removably fastened to said first and said second support arms and having one end seated on said seat flange; and a clamping member for clamping said end of said interface card against said seat flange.

* * * * *